US009849885B2

(12) United States Patent
Sakamoto et al.

(10) Patent No.: US 9,849,885 B2
(45) Date of Patent: Dec. 26, 2017

(54) VEHICLE, CONTROL APPARATUS FOR VEHICLE, AND CONTROL METHOD FOR VEHICLE

(71) Applicant: TOYOTA JIDOSHA KABUSHIKI KAISHA, Toyota-shi, Aichi-ken (JP)

(72) Inventors: Kazuya Sakamoto, Toyota (JP); Atsushi Ayabe, Toyota (JP); Kenji Matsuo, Toyota (JP); Hiroki Kondo, Miyoshi (JP); Mitsuhiro Fukao, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 40 days.

(21) Appl. No.: 15/107,230

(22) PCT Filed: Sep. 16, 2014

(86) PCT No.: PCT/IB2014/002045
§ 371 (c)(1),
(2) Date: Jun. 22, 2016

(87) PCT Pub. No.: WO2015/097501
PCT Pub. Date: Jul. 2, 2015

(65) Prior Publication Data
US 2017/0001647 A1    Jan. 5, 2017

(30) Foreign Application Priority Data
Dec. 25, 2013  (JP) .................................. 2013-268062

(51) Int. Cl.
*F16D 48/10*    (2006.01)
*F16D 23/06*    (2006.01)
(Continued)

(52) U.S. Cl.
CPC ............ *B60W 30/19* (2013.01); *B60W 10/02* (2013.01); *B60W 10/04* (2013.01);
(Continued)

(58) Field of Classification Search
CPC .......... F16D 48/06; F16D 48/10; F16D 23/06; F16D 2023/0693; F16D 2500/1045;
(Continued)

(56) References Cited

U.S. PATENT DOCUMENTS 9,038,493 B2 * 5/2015  Iwasaki ................... F16H 3/083
                                                              192/53.34
9,404,563 B2 * 8/2016  Yamamoto .......... F16H 37/0846
(Continued)

FOREIGN PATENT DOCUMENTS

JP    2004-270891 A    9/2004
JP    2006-153235 A    6/2006
JP    2010-281423 A    12/2010

*Primary Examiner* — Ramya Burgess
*Assistant Examiner* — David Morris
(74) *Attorney, Agent, or Firm* — Oliff PLC (57) ABSTRACT

In engaging (connecting) a dog clutch by operating a synchromesh mechanism, when there occurs an uplock at the time when a first pressing force is caused to act on a hub sleeve, tooth tips of spline teeth of the hub sleeve contact with tooth tips of spline teeth of a synchronizer ring, and these spline teeth cannot be engaged. However, when a second pressing force is caused to act on the hub sleeve, the uplock is easy to be released. In addition, when torque from an engine is caused to act on the hub sleeve, a displacement is caused to occur in a rotation direction between the mutually contacting spline teeth. Thus, the uplock is reliably released.

16 Claims, 5 Drawing Sheets

(51) Int. Cl.
*B60W 30/19* (2012.01)
*F16D 48/06* (2006.01)
*B60W 10/02* (2006.01)
*B60W 10/04* (2006.01)
*B60W 10/107* (2012.01)
*F16H 61/662* (2006.01)
*F16H 61/04* (2006.01)
*F16H 37/02* (2006.01)
*F16D 11/00* (2006.01)
*F16D 23/02* (2006.01)
*F16H 7/02* (2006.01)
*F16H 61/66* (2006.01)

(52) U.S. Cl.
CPC ........... *B60W 10/107* (2013.01); *F16D 48/06* (2013.01); *F16D 48/066* (2013.01); *F16H 61/662* (2013.01); *B60W 2510/0208* (2013.01); *B60W 2710/021* (2013.01); *B60W 2710/083* (2013.01); *B60W 2710/1005* (2013.01); *F16D 11/00* (2013.01); *F16D 23/02* (2013.01); *F16D 23/06* (2013.01); *F16D 48/10* (2013.01); *F16D 2500/106* (2013.01); *F16D 2500/1026* (2013.01); *F16D 2500/1088* (2013.01); *F16D 2500/10412* (2013.01); *F16D 2500/10456* (2013.01); *F16D 2500/10462* (2013.01); *F16D 2500/30412* (2013.01); *F16D 2500/3166* (2013.01); *F16D 2500/50607* (2013.01); *F16D 2500/70404* (2013.01); *F16D 2500/70406* (2013.01); *F16H 7/02* (2013.01); *F16H 37/022* (2013.01); *F16H 2061/047* (2013.01); *F16H 2061/661* (2013.01); *F16H 2306/00* (2013.01)

(58) Field of Classification Search
CPC . F16D 2500/10456; F16D 2500/10462; F16D 2500/50607
See application file for complete search history.

(56) References Cited

U.S. PATENT DOCUMENTS

| | | | | |
|---|---|---|---|---|
| 9,494,204 | B2* | 11/2016 | Matsuo | F16H 37/022 |
| 9,664,278 | B2* | 5/2017 | Toyoda | F16H 61/702 |
| 2014/0131158 | A1* | 5/2014 | Schabasser | F16D 23/04 |
| | | | | 192/48.5 |
| 2014/0283637 | A1* | 9/2014 | Iwasaki | F16H 3/083 |
| | | | | 74/335 |
| 2015/0354682 | A1* | 12/2015 | Yamamoto | F16H 37/0846 |
| | | | | 475/198 |
| 2016/0025161 | A1* | 1/2016 | Matsuo | F16H 37/022 |
| | | | | 477/180 |
| 2016/0131256 | A1* | 5/2016 | Toyoda | F16H 37/022 |
| | | | | 701/51 |
| 2016/0280064 | A1* | 9/2016 | Nozu | B60K 17/34 |
| 2016/0305522 | A1* | 10/2016 | Fukao | B60K 17/00 |
| 2016/0369856 | A1* | 12/2016 | Kimura | F16D 48/066 |
| 2017/0151949 | A1* | 6/2017 | Shimazu | B60W 30/181 |
| 2017/0159729 | A1* | 6/2017 | Sakamoto | F16D 48/062 |

* cited by examiner

VEHICLE, CONTROL APPARATUS FOR VEHICLE, AND CONTROL METHOD FOR VEHICLE

BACKGROUND OF THE INVENTION

1. Field of the Invention

The invention relates to a vehicle, a control apparatus for a vehicle, and a control method for a vehicle and, more particularly, to a vehicle including a dog clutch including a synchromesh mechanism in a power transmission path, a control apparatus for the vehicle, and a control method for the vehicle.

2. Description of Related Art

There is well known a synchromesh mechanism provided in a dog clutch that connects or disconnects a pair of rotating members. When the dog clutch is connected, the synchromesh mechanism synchronizes the rotation speeds of the rotating members having different rotation speeds, thus allowing smooth engagement. Japanese Patent Application Publication No. 2010-281423 (JP 2010-281423 A) describes a transmission device. The transmission device includes a plurality of synchromesh mechanisms. When a shift command is issued, the transmission device carries out shift operation by operating the synchromesh mechanism of a target speed position, into which a speed position is shifted, and, until a lapse of a predetermined time from when the shift command is issued, a synchronizer ring is pressed against a cone face of at least one other speed position other than the target speed position. In this way, by operating the synchromesh mechanism corresponding to another speed position to facilitate synchronization, a sufficient synchronization capacity is ensured. Therefore, it is possible to shorten a shift time without a complex or large structure of the transmission device.

SUMMARY OF THE INVENTION

Incidentally, when a synchromesh mechanism has normally operated in engaging (connecting) the dog clutch by operating the synchromesh mechanism, spline teeth formed on a hub sleeve of the synchromesh mechanism are meshed with spline teeth formed on a synchronizer ring of the synchromesh mechanism in a rotation direction. However, in synchronizing the rotation speeds of rotating members with each other, there may occur an engagement fault, which is a so-called uplock. In this engagement fault, the spline teeth of the hub sleeve and the spline teeth of the synchronizer ring contact with each other at their tooth tips, and these spline teeth cannot be engaged (meshed). If the uplock occurs, the dog clutch is not normally engaged (connected), so transmission of power is defective between the rotating members. As a method of preventing the uplock, for example, the following configuration is conceivable. A sensor that detects an uplock is provided, and, when an uplock has been detected, operation of the synchromesh mechanism is once cancelled, and then engagement operation is carried out again. However, a shift time extends. For example, a time is consumed to cancel operation of the synchromesh mechanism.

The invention provides a vehicle that includes a dog clutch including a synchromesh mechanism and that is able to, even when there occurs an uplock in engaging the dog clutch, cancel the uplock and quickly carry out shift operation, a control apparatus for the vehicle, and a control method for the vehicle.

A first aspect of the invention provides a control apparatus for a vehicle. The vehicle includes a dog clutch including a synchromesh mechanism. The synchromesh mechanism includes a sleeve and a synchronizer ring. When engagement of the dog clutch is determined, the sleeve is pressed against the synchronizer ring by a predetermined pressing force to be synchronized with the synchronizer ring, and then the dog clutch is engaged. The control apparatus includes: an electronic control unit configured to: (a) in engaging the dog clutch, cause a first pressing force to act on the sleeve, the first pressing force being required to engage the sleeve with the synchronizer ring; (b) after causing the first pressing force to act on the sleeve, cause a second pressing force to act on the sleeve, the second pressing force being smaller than the first pressing force, a synchronized state of the sleeve with the synchronizer ring being kept by the second pressing force under a condition that no torque is input to the sleeve; and (c) while causing the second pressing force to act on the sleeve, input torque from a driving force source of the vehicle to the sleeve.

With this configuration, in engaging (connecting) the dog clutch, when there occurs an uplock at the time when the first pressing force is caused to act on the sleeve, tooth tips of spline teeth of the sleeve contact with tooth tips of spline teeth of the synchronizer ring, and these spline teeth cannot be engaged; however, after that, the second pressing force is caused to act on the sleeve, so the uplock is easy to be released. In addition, when torque from the driving force source is caused to act on the sleeve, a displacement is caused to occur in the rotation direction between the mutually contacting spline teeth. Thus, the uplock is released. In this way, even when there occurs an uplock, the uplock is released, so it is possible to engage the dog clutch. When there occurs an uplock, the operation, such as cancelling the operation of the synchromesh mechanism once, is not required, so control is also simple, and extension of an engagement time is avoided.

In the control apparatus according to the above aspect, a first clutch may be provided in a power transmission path between the driving force source and the sleeve, and the electronic control unit may be configured to, after causing the second pressing force to act on the sleeve, input torque from the driving force source to the sleeve by starting engagement of the first clutch. In this way, engagement of the first clutch is started in a state where the second pressing force is caused to act on the sleeve, and then torque from the driving force source is transmitted to the sleeve via the first clutch. Thus, the sleeve and the synchronizer ring are displaced from each other in the rotation direction, with the result that the uplock is released.

In the control apparatus according to the above aspect, the electronic control unit may be configured to, after inputting torque from the driving force source to the sleeve, cause a pressing force to act on the sleeve, the pressing force being required to engage the sleeve with the synchronizer ring. With this configuration, after torque from the driving force source is input to the sleeve and the uplock is released, the pressing force that is required to engage the sleeve with the synchronizer ring is caused to act on the sleeve, so the dog clutch is reliably engaged.

In the control apparatus according to the above aspect, a continuously variable transmission and a gear mechanism may be provided in parallel with each other between an input shaft and an output shaft, torque output from the driving force source may be input to the input shaft, the torque may be transmitted to the output shaft, the first clutch and the dog clutch may be inserted in a first power transmission path through which torque of the driving force source is transmitted from the input shaft via the gear mechanism to the output shaft, and a second clutch may be inserted in a second power transmission path through which torque of the driving force source is transmitted from the input shaft via the continuously variable transmission to the output shaft, the second clutch may connect or interrupt the second power transmission path. With this configuration, when the first clutch and the dog clutch are engaged and the second clutch is released, the vehicle is allowed to travel by using the first power transmission path, whereas, when at least one of the first clutch and the dog clutch is released and the second clutch is engaged, the vehicle is allowed to travel by using the second power transmission path. In changing the power transmission path from the second power transmission path to the first power transmission path, the dog clutch and the first clutch need to be engaged. At this time, the second pressing force is caused to act on the sleeve that constitutes the synchromesh mechanism, and, in addition, torque is input to the sleeve by starting engagement of the first clutch. Thus, when there occurs an uplock, the uplock is reliably released.

In the control apparatus according to the above aspect, the electronic control unit may be configured to, when a power transmission path during traveling is changed from the second power transmission path to the first power transmission path, start engagement of the dog clutch, and, when the second pressing force is caused to act on the sleeve, release the second clutch and engage the first clutch. In this way, torque is input to the sleeve by starting engagement of the first clutch in a state where the second pressing force is caused to act on the sleeve, so, when there occurs an uplock, the uplock is reliably released.

In the control apparatus according to the above aspect, the electronic control unit may be configured to, while torque of the driving force source is transmitted via the second power transmission path to the output shaft, release the dog clutch. In this way, the dog clutch is released while torque of the driving force source is transmitted to the output shaft via the second power transmission path. Therefore, co-rotation of rotating members that constitute the first power transmission path is suppressed, so fuel economy improves, and, in addition, a decrease in durability due to high rotation of the rotating members that constitute the first power transmission path is also suppressed.

A second aspect of the invention provides a control method for a vehicle. The vehicle includes a dog clutch and an electronic control unit. The dog clutch includes a synchromesh mechanism. The synchromesh mechanism includes a sleeve and a synchronizer ring. When engagement of the dog clutch is determined, the sleeve is pressed against the synchronizer ring by a predetermined pressing force to be synchronized with the synchronizer ring, and then the dog clutch is engaged. The control method includes: (a) in engaging the dog clutch, causing, by the electronic control unit, a first pressing force to act on the sleeve, the first pressing force being required to engage the sleeve with the synchronizer ring; (b) after causing the first pressing force to act on the sleeve, causing, by the electronic control unit, a second pressing force to act on the sleeve, the second pressing force being smaller than the first pressing force, a synchronized state of the sleeve with the synchronizer ring being kept by the second pressing force under a condition that no torque is input to the sleeve; and (c) while causing the second pressing force to act on the sleeve, inputting, by the electronic control unit, torque from a driving force source of the vehicle to the sleeve.

A third aspect of the invention provides a vehicle. The vehicle includes: a dog clutch including a synchromesh mechanism, the synchromesh mechanism including a sleeve and a synchronizer ring, the sleeve, when engagement of the dog clutch is determined, being pressed against the synchronizer ring by a predetermined pressing force to be synchronized with the synchronizer ring, and then the dog clutch being engaged; and an electronic control unit configured to: (a) in engaging the dog clutch, cause a first pressing force to act on the sleeve, the first pressing force being required to engage the sleeve with the synchronizer ring; (b) after causing the first pressing force to act on the sleeve, cause a second pressing force to act on the sleeve, the second pressing force being smaller than the first pressing force, a synchronized state of the sleeve with the synchronizer ring being kept by the second pressing force under a condition that no torque is input to the sleeve; and (c) while causing the second pressing force to act on the sleeve, input torque from a driving force source of the vehicle to the sleeve.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Suitably, in the specification, an uplock means a state where tooth tips of spline teeth formed on a sleeve of a synchromesh mechanism contact tooth tips of spline teeth formed on a synchronizer ring of the synchromesh mechanism, and corresponds to a state where advance of the spline teeth of the sleeve is blocked.

Hereinafter, an embodiment of the invention will be described in detail with reference to the accompanying drawings. In the following embodiment, the drawings are simplified or modified where appropriate, and the scale ratio, shape, and the like, of each portion are not always accurately drawn.

Figure 1:
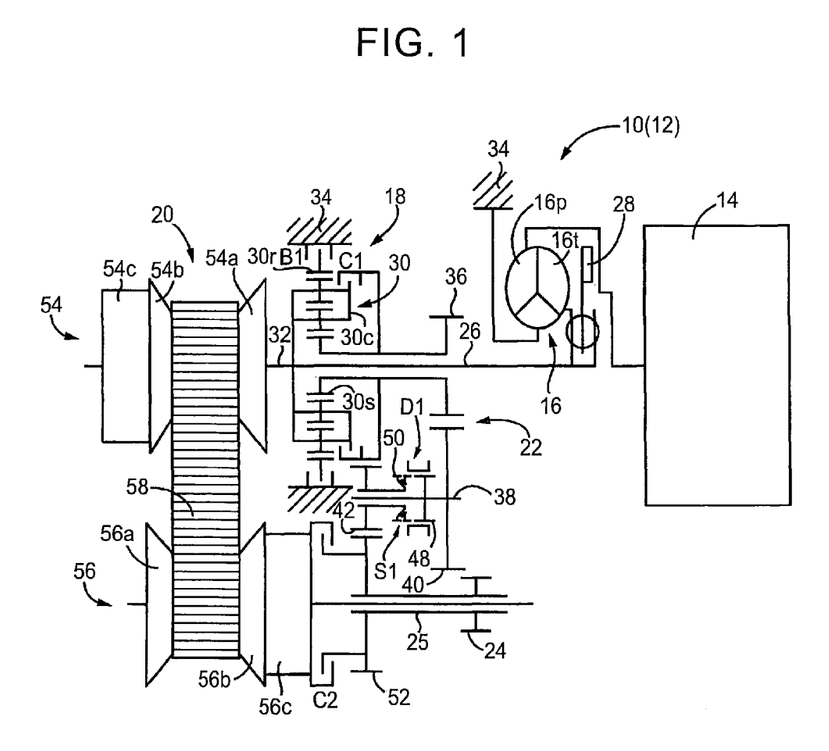
FIG. 1 is a skeletal view for illustrating the schematic configuration of a driving system provided in a vehicle according to an embodiment of the invention.

FIG. 1 is a skeletal view for illustrating the schematic configuration of a driving system 12 included in a vehicle 10 according to the embodiment of the invention. The driving system 12 includes, for example, an engine 14, a torque converter 16, a forward/reverse switching device 18, a belt-type continuously variable transmission 20 (hereinafter, continuously variable transmission 20), a gear mechanism 22, and an output shaft 25. The engine 14 is used as a driving force source for propelling the vehicle 10. The torque converter 16 serves as a fluid transmission device. An output gear 24 is formed on the output shaft 25. The output gear 24 is able to transmit power to drive wheels (not shown). The driving system 12 includes a first power transmission path and a second power transmission path in parallel with each other. Through the first power transmission path, torque (driving force) that is output from the engine 14 is input to a turbine shaft 26 via the torque converter 16, and the torque is transmitted from the turbine shaft 26 to the output shaft 25 via the gear mechanism 22, and the like. Through the second power transmission path, the torque input to the turbine shaft 26 is transmitted to the output shaft 25 via the continuously variable transmission 20 through the second power transmission path. The driving system 12 is configured to change the power transmission path on the basis of a traveling state of the vehicle 10. The turbine shaft 26 corresponds to an input shaft according to the invention.

The engine 14 is, for example, formed of a gasoline engine or a diesel engine. The torque converter 16 includes a pump impeller 16p and a turbine impeller 16t, and is configured to transmit power via fluid. The pump impeller 16p is coupled to a crankshaft of the engine 14. The turbine impeller 16t is coupled to the forward/reverse switching device 18 via the turbine shaft 26 that corresponds to an output-side member of the torque converter 16. A lockup clutch 28 is provided between the pump impeller 16p and the turbine impeller 16t. When the lockup clutch 28 is completely engaged, the pump impeller 16p and the turbine impeller 16t are integrally rotated.

The forward/reverse switching device 18 is mainly formed of a forward clutch C1, a reverse brake B1, and a double-pinion-type planetary gear train 30. A carrier 30c is integrally coupled to the turbine shaft 26 of the torque converter 16 and an input shaft 32 of the continuously variable transmission 20. A ring gear 30r is selectively coupled to a housing 34 via the reverse brake B1. The housing 34 serves as a non-rotating member. A sun gear 30s is connected to a small-diameter gear 36. The sun gear 30s and the carrier 30c are selectively coupled to each other via the forward clutch C1. Each of the forward clutch C1 and the reverse brake B1 corresponds to a separating device, and is a hydraulic friction engagement device that is frictionally engaged by a hydraulic actuator. The forward clutch C1 corresponds to a first clutch provided in a power transmission path between a driving force source and a sleeve according to the invention.

The sun gear 30s of the planetary gear train 30 is coupled to the small-diameter gear 36 that constitutes the gear mechanism 22. The gear mechanism 22 includes the small-diameter gear 36 and a large-diameter gear 40. The large-diameter gear 40 is provided on a counter shaft 38 so as to be relatively non-rotatable. An idler gear 42 is provided around the same rotation axis as that of the counter shaft 38 so as to be relatively rotatable with respect to the counter shaft 38. A dog clutch D1 is provided between the counter shaft 38 and the idler gear 42. The dog clutch D1 selectively connects the counter shaft 38 to the idler gear 42 or disconnects the counter shaft 38 from the idler gear 42. The dog clutch D1 includes a first gear 48, a second gear 50 and a hub sleeve 61. The first gear 48 is formed on the counter shaft 38. The second gear 50 is formed on the idler gear 42. Spline teeth 70 are formed on the hub sleeve 61. The spline teeth 70 are able to be fitted to (be engaged with, be meshed with) these first gear 48 and second gear 50. When the hub sleeve 61 is fitted to these first gear 48 and second gear 50, the counter shaft 38 is connected to the idler gear 42. The dog clutch D1 further includes a synchromesh mechanism S1. The synchromesh mechanism S1 serves as a synchronization mechanism that synchronizes rotations at the time of fitting the first gear 48 to the second gear 50.

The idler gear 42 is in mesh with an input gear 52 having a larger diameter than the idler gear 42. The input gear 52 is provided so as to be relatively non-rotatable with respect to the output shaft 25. The output shaft 25 is arranged along a rotation axis common to the rotation axis of a secondary pulley (described later) of the continuously variable transmission 20. The output shaft 25 is arranged so as to be rotatable around the rotation axis. The input gear 52 and the output gear 24 are provided on the output shaft 25 so as to be relatively non-rotatable. Thus, the forward clutch C1, the reverse brake B1 and the dog clutch D1 are inserted in the first power transmission path through which torque of the engine 14 is transmitted from the turbine shaft 26 via the gear mechanism 22 to the output shaft 25.

A belt driving clutch C2 is inserted between the continuously variable transmission 20 and the output shaft 25. The belt driving clutch C2 selectively connects the continuously variable transmission 20 to the output shaft 25 or disconnects the continuously variable transmission 20 from the output shaft 25. When the belt driving clutch C2 is engaged, the second power transmission path is established. Through the second power transmission path, torque of the engine 14 is transmitted to the output shaft 25 via the input shaft 32 and the continuously variable transmission 20. When the belt driving clutch C2 is released, the second power transmission path is interrupted, and no torque is transmitted from the continuously variable transmission 20 to the output shaft 25. The belt driving clutch C2 corresponds to a second clutch that connects or interrupts a second power transmission path according to the invention.

The continuously variable transmission 20 includes a primary pulley 54 (variable pulley 54), the secondary pulley 56 (variable pulley 56), and a transmission belt 58. The continuously variable transmission 20 is provided in a power transmission path between the input shaft 32 and the output shaft 25. The input shaft 32 is coupled to the turbine shaft 26. The primary pulley 54 is an input-side member provided on the input shaft 32, and has a variable effective diameter. The secondary pulley 56 is an output-side member, and has a variable effective diameter. The transmission belt 58 is wound around the pair of variable pulleys 54, 56 so as to span between the pair of variable pulleys 54, 56. Power is transmitted via friction force between the pair of variable pulleys 54, 56 and the transmission belt 58.

The primary pulley 54 includes a fixed sheave 54a, a movable sheave 54b, and a primary hydraulic actuator 54c. The fixed sheave 54a serves as an input-side fixed rotor fixed to the input shaft 32. The movable sheave 54*b* serves as an input-side movable rotor provided so as to be relatively non-rotatable around its axis and movable in the axial direction with respect to the input shaft 32. The primary hydraulic actuator 54*c* generates thrust for moving the variable sheave 54*b* in order to change the V-groove width between the fixed sheave 54*a* and the movable sheave 54*b*. The secondary pulley 56 includes a fixed sheave 56*a*, a movable sheave 56*b*, and a secondary hydraulic actuator 56*c*. The fixed sheave 56*a* serves as an output-side fixed rotor. The movable sheave 56*b* serves as an output-side movable rotor provided so as to be relatively non-rotatable around its axis and movable in the axial direction with respect to the fixed sheave 56*a*. The secondary hydraulic actuator 56*c* generates thrust for moving the movable sheave 56*b* in order to change the V-groove width between the fixed sheave 56*a* and the movable sheave 56*b*.

The V-groove width of each of the pair of variable pulleys 54, 56 changes, so the winding diameter (effective diameter) of the transmission belt 58 is changed. Thus, an actual speed ratio (gear ratio) $\gamma$ (=Input shaft rotation speed Nin/Output shaft rotation speed Nout) is continuously changed. For example, when the V-groove width of the primary pulley 54 is reduced, the speed ratio $\gamma$ decreases. That is, the continuously variable transmission 20 is upshifted. When the V-groove width of the primary pulley 54 is increased, the speed ratio $\gamma$ increases. That is, the continuously variable transmission 20 is downshifted.

Figure 2:
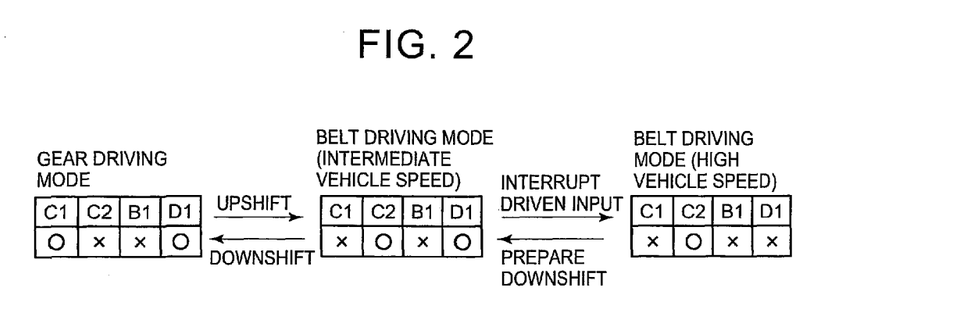
FIG. 2 is a view that shows changes in driving pattern of the driving system shown in FIG. 1.

Hereinafter, the operation of the thus-configured driving system 12 will be described by using an engagement chart of engagement elements for each driving pattern shown in FIG. 2. In FIG. 2, C1 corresponds to the operation state of the forward clutch C1, C2 corresponds to the operation state of the belt driving clutch C2, B1 corresponds to the operation state of the reverse brake B1, D1 corresponds to the operation state of the dog clutch D1, "O" indicates an engaged (connected) state, and "x" indicates a released (disconnected) state. The dog clutch D1 includes the synchromesh mechanism S1. When the dog clutch D1 is engaged, the synchromesh mechanism S1 operates.

Initially, the driving pattern in which torque of the engine 14 is transmitted to the output gear 24 via the gear mechanism 22, that is, the driving pattern in which torque is transmitted through the first power transmission path, will be described. This driving pattern corresponds to the gear driving mode shown in FIG. 2. As shown in FIG. 2, the forward clutch C1 and the dog clutch D1 are engaged (connected), while the belt driving clutch C2 and the reverse brake B1 are released (disconnected).

When the forward clutch C1 is engaged, the planetary gear train 30 that constitutes the forward/reverse switching device 18 is integrally rotated, so the small-diameter gear 36 is rotated at the same rotation speed as the turbine shaft 26. Because the small-diameter gear 36 is in mesh with the large-diameter gear 40 provided on the counter shaft 38, the counter shaft 38 is also similarly rotated. Because the dog clutch D1 is engaged, the counter shaft 38 and the idler gear 42 are connected to each other, and the idler gear 42 is meshed with the input gear 52, so the output shaft 25 and the output gear 24 that are provided integrally with the input gear 52 are rotated. In this way, when the forward clutch C1 and the dog clutch D1 inserted in the first power transmission path are engaged, torque of the engine 14 is transmitted to the output shaft 25 and the output gear 24 via the torque converter 16, the turbine shaft 26, the forward/reverse switching device 18, the gear mechanism 22, the idler gear 42, and the like.

Subsequently, the driving pattern in which torque of the engine 14 is transmitted to the output gear 24 via the continuously variable transmission 20 will be described. This driving pattern corresponds to a belt driving mode (high vehicle speed) shown in FIG. 2. As shown in the belt driving mode of FIG. 2, the belt driving clutch C2 is connected, while the forward clutch C1, the reverse brake B1 and the dog clutch D1 are disconnected. When the belt driving clutch C2 is connected, the secondary pulley 56 is connected to the output shaft 25, so the secondary pulley 56 integrally rotates with the output shaft 25 and the output gear 24. Thus, when the belt driving clutch C2 is connected, the second power transmission path is established, and torque of the engine 14 is transmitted to the output gear 24 via the torque converter 16, the turbine shaft 26, the input shaft 32, the continuously variable transmission 20 and the output shaft 25. At this time, the reason why the dog clutch D1 is released (disconnected) during the belt driving mode in which torque of the engine 14 is transmitted via the second power transmission path is because a drag of the gear mechanism 22, or the like, is eliminated during the belt driving mode, and high rotation of the gear mechanism 22, and the like, is prevented at a high vehicle speed.

The gear driving mode is selected in a low vehicle speed region. A speed ratio $\gamma 1$ (Input shaft rotation speed Nin/Output shaft rotation speed Nout) based on the first power transmission path is set to a value higher than a maximum speed ratio $\gamma$max of the continuously variable transmission 20. That is, the speed ratio $\gamma 1$ is set to a value that is not set in the continuously variable transmission 20. When it is determined to change into the belt driving mode as a result of, for example, an increase in the vehicle speed V, the driving pattern is changed to the belt driving mode. In changing from the gear driving mode to the belt driving mode (high vehicle speed) or changing from the belt driving mode (high vehicle speed) to the gear driving mode, a belt driving mode (intermediate vehicle speed) shown in FIG. 2 is transitionally set.

For example, when the driving pattern is changed from the gear driving mode to the belt driving mode (high vehicle speed), the operation state is transitionally changed from the state where the forward clutch C1 and the dog clutch D1, corresponding to the gear driving mode, are engaged to the state where the belt driving clutch C2 and the dog clutch D1 are engaged. That is, a change of the engaged/released state is started between the forward clutch C1 and the belt driving clutch C2. At this time, the power transmission path is changed from the first power transmission path to the second power transmission path, and the driving system 12 is substantially upshifted. After the power transmission path is changed, the dog clutch D1 is released (disconnected) in order to prevent an unnecessary drag or high rotation of the gear mechanism 22, and the like (driven input is interrupted).

When the driving pattern is changed from the belt driving mode (high vehicle speed) to the gear driving mode, the operation state is transitionally changed from the state where the belt driving clutch C2 is engaged to the state where the dog clutch D1 is engaged in preparation for changing into the gear driving mode (downshift preparation). At this time, rotation is also transmitted to the sun gear 30*s* of the planetary gear train 30 via the gear mechanism 22. When a change of the engaged/released state is carried out between the forward clutch C1 and the belt driving clutch C2 (the forward clutch C1 is engaged and the belt driving clutch C2 is released) from this state, the power transmission path is changed from the second power transmission path to the first power transmission path. At this time, the driving system 12 is substantially downshifted.

Figure 3A:
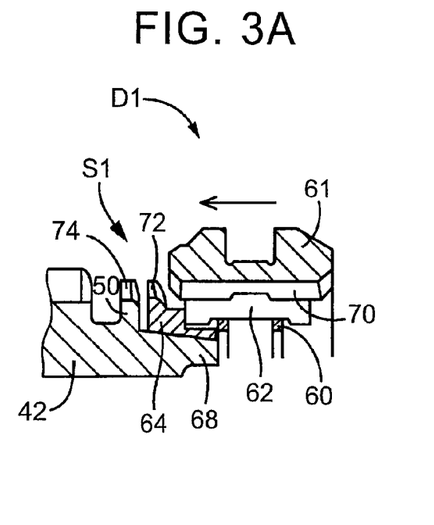
FIG. 3A is a view that illustrates the configuration of a synchromesh mechanism shown in FIG. 1.
Figure 3B:
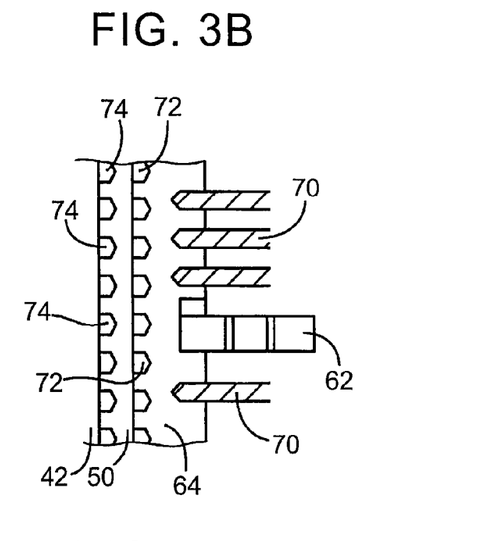
FIG. 3B is a view that illustrates the operation of the synchromesh mechanism shown in FIG. 1.
Figure 4A:
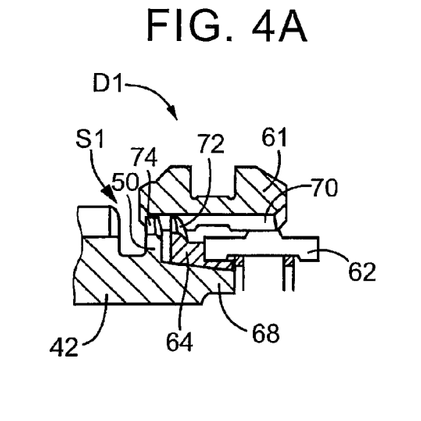
FIG. 4A is another view that illustrates the configuration of the synchromesh mechanism shown in FIG. 1.
Figure 4B:
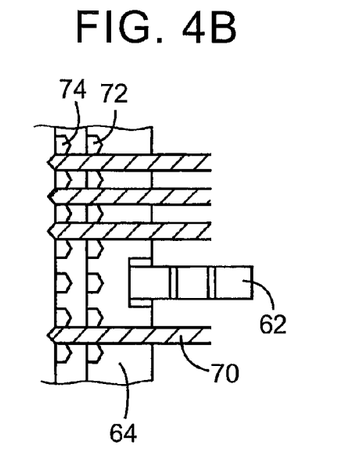
FIG. 4B is another view that illustrates the operation of the synchromesh mechanism shown in FIG. 1.

FIG. 3A, FIG. 3B, FIG. 4A and FIG. 4B are views that illustrate the configuration and operation of the dog clutch D1 and the configuration and operation of the synchromesh mechanism S1 provided in the dog clutch D1. FIG. 3A and FIG. 3B show a state where the dog clutch D1 is released (disconnected). FIG. 4A and FIG. 4B show a state where the dog clutch D1 is engaged (connected). FIG. 3A and FIG. 4A are cross-sectional views of the synchromesh mechanism S1. FIG. 3B and FIG. 4B are developed views excluding a cylindrical portion of the hub sleeve 61 when the states of FIG. 3A and FIG. 4A are viewed from the radially outer side. As shown in FIG. 3A, the synchromesh mechanism S1 includes the hub sleeve 61, a shifting key 62, a synchronizer ring 64 and a cone portion 68. The shifting key 62 is engaged with the hub sleeve 61 by a key spring 60. The synchronizer ring 64 is rotated together with the shifting key 62 with a predetermined play. The cone portion 68 is provided near the second gear 50. The spline teeth 70 are provided on the inner periphery of the hub sleeve 61. Therefore, the hub sleeve 61 is constantly spline-fitted to the first gear 48, and is constantly integrally rotated together with the first gear 48. When the hub sleeve 61 is moved leftward in the drawing, the synchronizer ring 64 is pressed against the cone portion 68 via the shifting key 62, and power is transmitted to the second gear 50 by friction between the synchronizer ring 64 and the cone portion 68. When the hub sleeve 61 is further moved leftward, the spline teeth 70 of the hub sleeve 61 are pressed against the spline teeth 72 of the second gear 50 by a predetermined pressing force, so the hub sleeve 61 is synchronized with the second gear 50. As shown in FIG. 4A and FIG. 4B, the spline teeth 70 are meshed and engaged with the spline teeth 72 provided in the synchronizer ring 64 and further the spline teeth 74 provided in the second gear 50. Thus, the first gear 48 and the second gear 50 are integrally connected, and the power transmission path is established between the forward/reverse switching device 18 and the output gear 24. The hub sleeve 61 is a member that constitutes the dog clutch D1. However, the hub sleeve 61 presses the shifting key 62 or synchronization progresses when the spline teeth 70 of the hub sleeve 61 and the spline teeth 74 of the second gear 50 are pressed against each other, so the hub sleeve 61 is also included in members that constitute the synchromesh mechanism S1.

Figure 5:
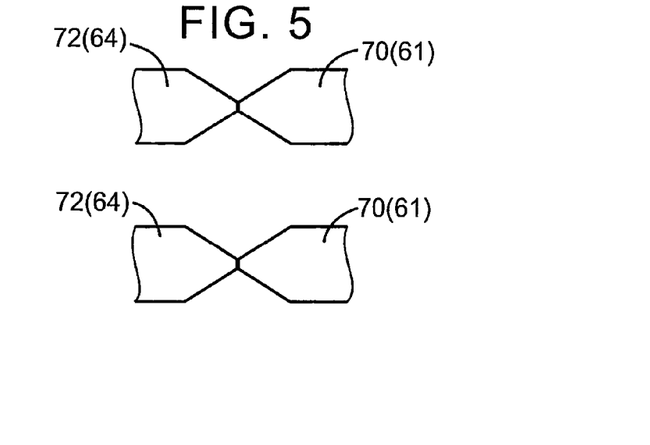
FIG. 5 is a view that illustrates a state where there occurs an uplock in the synchromesh mechanism shown in FIG. 1.

Incidentally, in transitionally changing from the belt driving mode (high vehicle speed) to the belt driving mode (intermediate vehicle speed), engagement of the dog clutch D1 (that is, operation of the synchromesh mechanism S1) is started, and the dog clutch D1 is transitionally engaged. However, as shown in FIG. 5, when the tooth tips of the spline teeth 70 of the hub sleeve 61 of the synchromesh mechanism S1 contact (collide) with the tooth tips of the spline teeth 72 of the synchronizer ring 64, further movement of the hub sleeve 61 is difficult, and meshing of the dog clutch D1 is defective. In such a case, engagement of the dog clutch D1 is defective, so transmission of power of the dog clutch D1 is insufficient. In contrast, in engaging the dog clutch D1, an electronic control unit 80 (described later) executes the operation that will be described below. Thus, the dog clutch D1 is reliably engaged even when the above-described tooth tips of the mutual spline teeth collide with each other. In the following description, the state where the above-described tooth tips of the mutual spline teeth collide with each other and connection of the dog clutch D1 is defective is defined as uplock.

Figure 6:
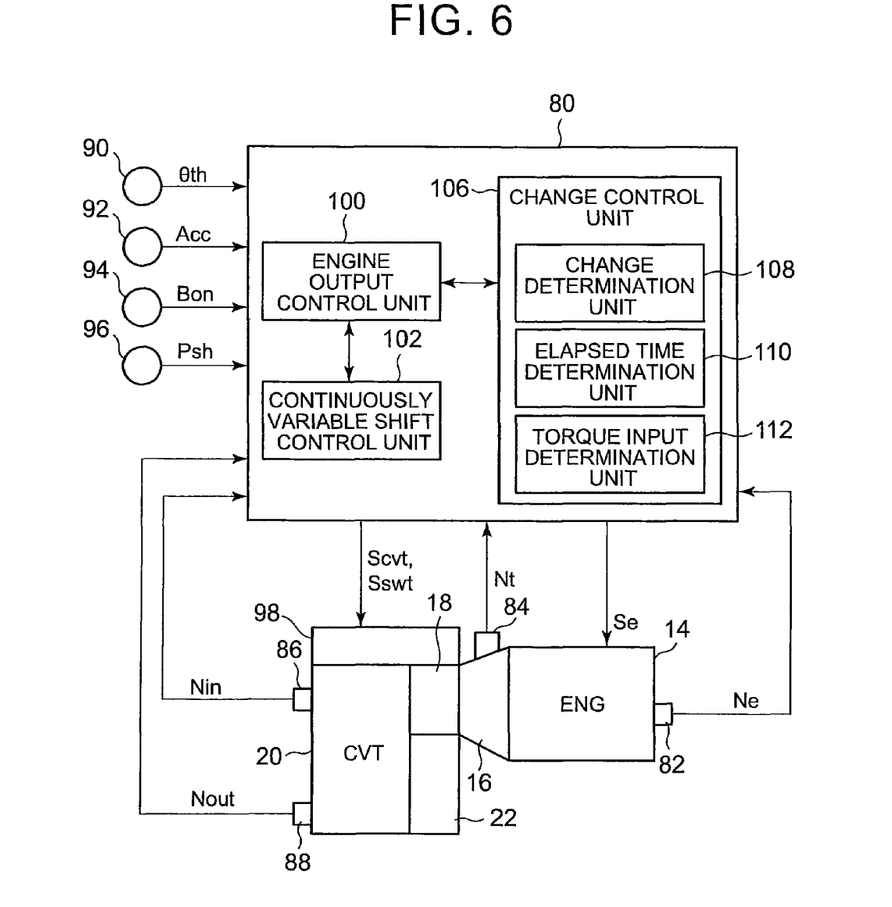
FIG. 6 is a functional block diagram that illustrates input/output, lines of an electronic control unit that controls the driving system shown in FIG. 1 and that illustrates a relevant portion of control functions implemented by the electronic control unit.

FIG. 6 is a functional block diagram that illustrates input/output lines of the electronic control unit 80 provided in the vehicle 10 in order to control the engine 14, the continuously variable transmission 20, and the like, and that illustrates a relevant portion of control functions implemented by the electronic control unit 80. The electronic control unit 80 includes a so-called microcomputer. The microcomputer includes, for example, a CPU, a RAM, a ROM, input/output interfaces, and the like. The CPU executes various controls over the vehicle 10 by executing signal processing in accordance with programs prestored in the ROM while utilizing a temporary storage function of the RAM. For example, the electronic control unit 80 is configured to execute output control over the engine 14, shift control and belt clamping force control over the continuously variable transmission 20, control for appropriately changing the driving pattern to one of the gear driving mode in which the gear mechanism 22 is used and the belt driving mode in which the continuously variable transmission 20 is used, and the like. Where necessary, the electronic control unit 80 is split into an electronic control unit for controlling the engine, an electronic control unit for controlling the continuously variable transmission, an electronic control unit for changing the driving patter, and the like.

A signal indicating a rotation angle (position) Acr of the crankshaft and a rotation speed (engine rotation speed) Ne of the engine 14, a signal indicating a rotation speed (turbine rotation speed) Nt of the turbine shaft 26, a signal indicating the input shaft rotation speed Nin, a signal indicating the output shaft rotation speed Nout, a signal indicating a throttle opening degree θth of an electronic throttle valve, a signal indicating an accelerator operation amount Acc, a signal indicating a brake signal Bon, a signal indicating a lever position (operating position) Psh of a shift lever, and the like, are supplied to the electronic control unit 80. The rotation angle (position) Acr of the crankshaft and the engine rotation speed Ne are detected by an engine rotation speed sensor 82. The turbine rotation speed Nt is detected by a turbine rotation speed sensor 84. The input shaft rotation speed Nin is the rotation speed of the input shaft 32 (primary pulley 54) of the continuously variable transmission 20, and is detected by an input shaft rotation speed sensor 86. The output shaft rotation speed Nout is the rotation speed of the secondary pulley 56 of the continuously variable transmission 20, corresponds to the vehicle speed V, and is detected by an output shaft rotation speed sensor 88. The throttle opening degree θth of the electronic throttle valve is detected by a throttle sensor 90. The accelerator operation amount Acc is the operation amount of an accelerator pedal as a driver's acceleration request amount, and is detected by an accelerator operation amount sensor 92. The brake signal Bon indicates a state where a foot brake is operated, and is detected by a foot brake switch 94. The foot brake is a service brake. The lever position (operating position) Psh of the shift lever is detected by a lever position sensor 96. The electronic control unit 80, for example, sequentially calculates the actual speed ratio γ (=Nin/Nout) of the continuously variable transmission 20 on the basis of the output shaft rotation speed Nout and the input shaft rotation speed Nin.

An engine output control command signal Se, a hydraulic control command signal Scvt, a hydraulic control command signal Sswt, and the like, are output from the electronic control unit 80. The engine output control command signal Se is used for output control over the engine 14. The hydraulic control command signal Scvt is used for hydraulic control associated with a shift of the continuously variable transmission 20. The hydraulic control command signal Sswt is used to control the forward/reverse switching device 18 (the forward clutch C1, the reverse brake B1), the belt driving clutch C2 and the dog clutch D1 associated with a change of the driving pattern of the driving system 12. Specifically, a throttle signal, an injection signal, an ignition timing signal, and the like, are output as the engine output control command signal Se. The throttle signal is used to control the open/close of the electronic throttle valve by driving a throttle actuator. The injection signal is used to control the amount of fuel that is injected from a fuel injection device. The ignition timing signal is used to control the ignition timing of the engine 14 by an ignition device. A command signal for driving a linear solenoid valve (not shown) that regulates a primary pressure Pin, a command signal for driving a linear solenoid valve (not shown) that regulates a secondary pressure Pout, and the like, are output to a hydraulic control circuit 98 as the hydraulic control command signal Scvt. The primary pressure Pin is supplied to the primary hydraulic actuator 54c. The secondary pressure Pout is supplied to the secondary hydraulic actuator 56c. Command signals, and the like, for respectively driving linear solenoid valves that control hydraulic pressures that are supplied to the forward clutch C1, the reverse brake B1, the belt driving clutch C2 and the synchromesh mechanism S1 are output to the hydraulic control circuit 98 as the hydraulic control command signal Sswt.

Next, the control functions of the electronic control unit 80 will be described. An engine output control unit 100 (engine output control means) shown in FIG. 6, for example, outputs the engine output control command signal Se, such as the throttle signal, the injection signal and the ignition timing signal, to the throttle actuator, the fuel injection device and the ignition device in order to execute output control over the engine 14. The engine output control unit 100, for example, sets a target engine torque Te* for obtaining a required driving force (driving torque). The required driving force is calculated on the basis of the accelerator operation amount Acc and the vehicle speed V. The engine output control unit 100 controls not only the open/close of the electronic throttle valve by the throttle actuator but also the fuel injection amount by the fuel injection device and the ignition timing by the ignition device so that the target engine torque Te* is obtained.

A continuously variable shift control unit 102 (continuously variable shift control means) controls the speed ratio γ of the continuously variable transmission 20 so that a target speed ratio γ* is obtained. The target speed ratio γ* is calculated on the basis of the accelerator operation amount Acc, the vehicle speed V, the brake signal Bon, and the like. Specifically, the continuously variable shift control unit 102 determines a primary command pressure Pintgt and a secondary command pressure Pouttgt so that the target speed ratio γ* of the continuously variable transmission 20 is achieved while a belt slip of the continuously variable transmission 20 does not occur. The continuously variable shift control unit 102 outputs the primary command pressure Pintgt and the secondary command pressure Pouttgt to the hydraulic control circuit 98. The target speed ratio γ* is set so that the operating point of the engine 14 is on an optimal line. The primary command pressure Pintgt is a command value of the primary pressure Pin (target primary pressure Pin). The secondary command pressure Pouttgt is a command value of the secondary pressure Pout (target secondary pressure Pout*).

A change control unit 106 (change control means) executes change control for changing the driving pattern on the basis of the traveling state of the vehicle 10 into the gear driving mode using the first power transmission path or the belt driving mode (high vehicle speed) using the second power transmission path. In the gear driving mode, torque of the engine 14 is transmitted to the output gear 24 via the gear mechanism 22. In the belt driving mode (high vehicle speed), torque of the engine 14 is transmitted to the output gear 24 via the continuously variable transmission 20. The change control unit 106 functionally includes a change determination unit 108 (change determination means), an elapsed time determination unit 110 (elapsed time determination means) and a torque input determination unit 112 (torque input determination means).

The change determination unit 108 determines whether to change the driving pattern during vehicle traveling. The change determination unit 108, for example, stores a driving region map for determining the driving pattern of the vehicle 10, and determines to change the driving pattern when the current traveling state enters a driving region different from a driving region of the driving pattern based on the map. The driving pattern of the vehicle 10 is formed of the vehicle speed V and the accelerator operation amount Acc (or the throttle opening degree θth) obtained in advance. The gear driving mode is set to a low vehicle speed and low accelerator operation amount (low load driving) region. The belt driving mode is set to an intermediate and high vehicle speed and intermediate and high accelerator operation amount (intermediate and high load driving) region.

When it is determined to change the driving pattern on the basis of the change determination unit 108, the change control unit 106 changes the driving pattern. Initially, the case where the driving pattern is changed from the gear driving mode to the belt driving mode (high vehicle speed) will be described. The change control unit 106 initially starts a change of engaged/released state between the forward clutch C1 and the belt driving clutch C2 in order to changes from the first power transmission path to the second power transmission path. Specifically, engagement changing control (clutch-to-clutch control) is executed. In the engagement changing control, the forward clutch C1 is released, and the belt driving clutch C2 is engaged. This state corresponds to the belt driving mode (intermediate vehicle speed) that is transitionally changed in FIG. 2, and the transmission path changes from the first power transmission path, through which torque is transmitted via the gear mechanism 22, to the second power transmission path, through which torque is transmitted via the continuously variable transmission 20. Subsequently, the change control unit 106 outputs a command to disconnect the connected dog clutch D1 by moving the hub sleeve 61 of the synchromesh mechanism S1. The hub sleeve 61 is driven by a hydraulic actuator (not shown), and a pressing force that is applied to the hub sleeve 61 is adjusted by a hydraulic pressure that is supplied to the hydraulic actuator. That is, the synchromesh mechanism S1 operates under the hydraulic pressure.

Next, the case where the driving pattern is changed from the belt driving mode (high vehicle speed) to the gear driving mode, that is, the case where the power transmission path is changed from the second power transmission path to the first power transmission path, will be described. In changing the driving pattern into the gear driving mode, initially, the synchromesh mechanism S1 is operated to start engaging (connecting) the clog clutch D1; however, there is a possibility that the above-described uplock occurs. In contrast, by executing control described below, the dog clutch D1 is reliably engaged even when there occurs the uplock.

Figure 7A:
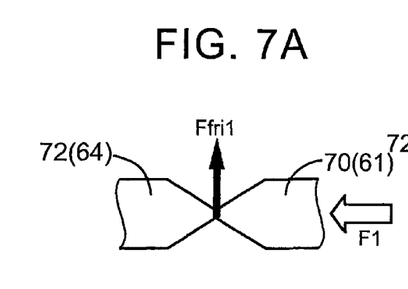
FIG. 7A and FIG. 7B are views for illustrating a state of a spline tooth of a hub sleeve and a spline tooth of a synchronizer ring when there occurs an uplock at the time of operating the synchromesh mechanism shown in FIG. 1.

When a command to engage the dog clutch D1 in a released state (disconnected state) is output as a result of determination to engage the dog clutch D1 on the basis of the change determination unit 108, the change control unit 106 outputs a command to apply a first pressing force F1 to the hub sleeve 61 for a predetermined time ta by operating the synchromesh mechanism S1. The first pressing force F1 is a pressing force that is required to engage the spline teeth 70 of the hub sleeve 61 with the spline teeth 72 of the synchronizer ring 64 (in other words, a pressing force that is required to engage the hub sleeve 61 with the synchronizer ring 64). The predetermined time ta is set in advance. Thus, the hub sleeve 61 is pressed against the synchronizer ring 64 by the first pressing force F1, so synchronization is started. When there occurs no uplock, the spline teeth 70, 72 are pushed in between the counter spline teeth 72, 70, with the result that the spline teeth 70, 72 are engaged with each other (completion of engagement). On the other hand, when there occurs an uplock, the tooth tips of the mutual spline teeth 70, 72 contact with each other as shown in FIG. 5, and engagement between the spline teeth 70, 72 is blocked. This state is shown in FIG. 7A. The first pressing force F1 acts on the spline teeth 70 of the hub sleeve 61, and the first pressing force F1 has a magnitude required to engage the mutual spline teeth 70, 72 with each other, so the first pressing force F1 is set to a relatively large value. Thus, when the mutual spline teeth 70, 72 contact with each other, a friction force Ffri1 that is generated at these tooth tips also increases, and these spline teeth 70, 72 are difficult to be displaced in the rotation direction. The first pressing force F1 is obtained on the basis of an experiment, or the like, in advance.

Figure 7B:
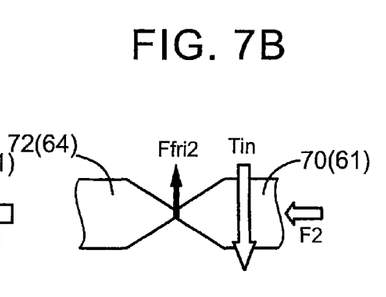

The elapsed time determination unit 110 determines whether the predetermined time ta has elapsed from when the command to engage the dog clutch D1 is output. The predetermined time ta is set to a time that is taken for the mutual spline teeth 70, 72 to engage with each other in the case where there occurs no uplock. When it is determined that the predetermined time ta has elapsed on the basis of the elapsed time determination unit 110, the change control unit 106 changes the pressing force for pressing the hub sleeve 61 to a second pressing force F2 (F2<F1) smaller than the first pressing force F1. The second pressing force F2 is obtained on the basis of an experiment, or the like, in advance. The second pressing force F2 is set to a minimum value or a value close to the minimum value within a range in which the synchromesh mechanism S1 is not released, that is, within a range in which the mutual spline teeth 70, 72 keep contacting with each other (synchronization is kept) under the condition that no torque is input to the hub sleeve 61. In this way, by reducing the pressing force for pressing the hub sleeve 61, as shown in FIG. 7B, an uplock state is alleviated, and a friction force Ffri2 that is generated between the tooth tips of the spline teeth 70, 72 also decreases (Ffri2<Ffri1).

After the pressing force that acts on the hub sleeve 61 becomes the second pressing force F2, the change control unit 106 outputs a command to start a change of the engaged/released state for engaging the forward clutch C1 and releasing the belt driving clutch C2 to the hydraulic control circuit 98. This corresponds to a change from the belt driving mode (intermediate vehicle speed) to the gear driving mode in FIG. 2. Because the forward clutch C1 is provided in the power transmission path between the engine 14 and the sleeve 61, torque of the engine 14, which is transmitted to the hub sleeve 61, increases with an increase in the engagement capacity of the forward clutch C1. When a change of the engaged/released state is started between the clutches C1, C2, the torque input determination unit 112 is executed.

The torque input determination unit 112 determines whether torque Tin is input from the engine side to the hub sleeve 61. The torque input determination unit 112 determines whether the torque Tin is input from the engine side to the hub sleeve 61 on the basis of, for example, whether a predetermined time tb has elapsed from when a change of the engaged/released state is started between the clutches C1, C2 or whether a detected hydraulic pressure of the hydraulic actuator of the forward clutch C1 has reached a preset predetermined value. The predetermined time tb or the predetermined value of the hydraulic pressure is a value set on the basis of an experiment, or the like, in advance, and is set to a value at which the torque Tin is input to the hub sleeve 61 via the forward clutch C1. This torque Tin is set to a value at which, in a state where the spline teeth 70 and the spline teeth 72 are in an uplock state and the second pressing force F2 is applied to the hub sleeve 61, a displacement in rotation direction occurs between the spline teeth 70 and the spline teeth 72 and the uplock is released. As alternative means for determining a torque input, it may be determined on the basis of the rotational speed difference of the forward clutch C1, or it may be determined by directly detecting torque to the hub sleeve 61 by a sensor. That is, it is not limited as long as it is possible to directly or indirectly determine a torque input to the hub sleeve 61.

When affirmative determination is made in the torque input determination unit 112, the torque Tin is input from the engine side while the second pressing force F2 is acting on the hub sleeve 61, so, in an uplock state, a displacement (relative rotation) occurs between the spline teeth 70 and the spline teeth 72, with the result that the uplock is released. When affirmative determination is made in the torque input determination unit 112, the change control unit 106 outputs a command to change the pressing force that acts on the hub sleeve 61 to a pressing force F that is able to push the spline teeth 70, 72 in between the counter spline teeth 72, 70, that is, a pressing force (for example, the first pressing force F1) that is required to engage (the spline teeth 70 of) the hub sleeve 61 with (the spline teeth 72 of) the synchronizer ring 64. Thus, in an uplock state, the hub sleeve 61 is further pushed into the synchronizer ring 64 in a state where the uplock is released, so the dog clutch D1 is reliably connected. The pressing force that is required for engagement is desirably a value about the first pressing force F1 for reliable engagement; however, a pressing force that engages the hub sleeve 61 with the synchronizer ring 64 may be obtained by an experiment, or the like, in advance, and the obtained pressing force may be set for the pressing force. For example, when the hub sleeve 61 is engaged with the synchronizer ring 64 even when the second pressing force F2 is applied, the pressing force may be the second pressing force F2.

The change control unit 106 determines whether a predetermined time tc has elapsed from when a command for applying the pressing force F that is able to push the spline teeth 70, 72 in between the counter spline teeth 72, 70 is output after determination of torque input to the hub sleeve 61. When the predetermined time tc elapses, it is determined that connection of the dog clutch D1 by the synchromesh mechanism S1 has completed, and the pressing force that acts on the hub sleeve 61 is reduced to a value at which engagement of the dog clutch D1 is kept. The predetermined time tc is a value obtained in advance, and is set to a value during which the hub sleeve 61 starts being pushed into the synchronizer ring 64 after releasing an uplock and then connection of the dog clutch D1 by the synchromesh mechanism S1 completes.

Figure 8:
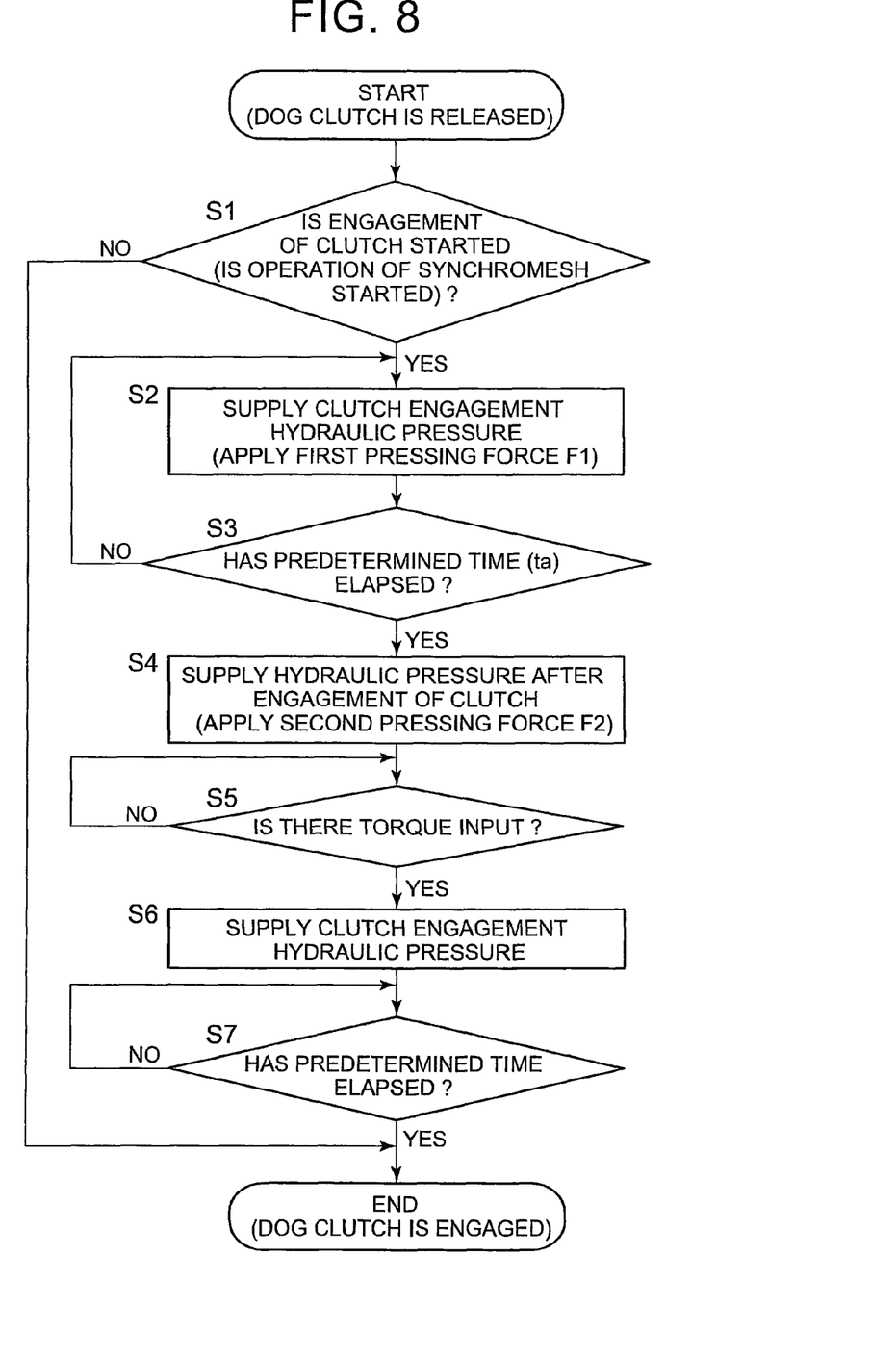
FIG. 8 is a flowchart that illustrates a relevant portion of the electronic control unit shown in FIG. 6, that is, control operations for reliably engaging a dog clutch in changing from a belt driving mode to a gear driving mode even when there occurs an uplock at the time when the synchromesh mechanism is operated.

FIG. 8 is a flowchart that illustrates a relevant portion of control operations of the electronic control unit 80, that is, control operations for reliably connecting the dog clutch D1 in changing from the belt driving mode to the gear driving mode even when there occurs an uplock in the synchromesh mechanism S1 included in the dog clutch D1. This flowchart is repeatedly executed at an extremely short cycle time of about, for example, several milliseconds to several tens of milliseconds.

Initially, in step S1 (hereinafter, step is omitted) corresponding to the change determination unit 108, it is determined whether engagement of the dog clutch D1 by using the synchromesh mechanism S1 is started. When negative determination is made in S1, the routine is ended. When affirmative determination is made in S1, in S2 corresponding to the change control unit 106, the hydraulic pressure is supplied to the hydraulic actuator that controls the pressing force for pressing the hub sleeve 61 so that the first pressing force F1 acts on the hub sleeve 61. At this time, when there occurs no uplock, the spline teeth 70 of the hub sleeve 61 and the spline teeth 72 of the synchronizer ring 64 are engaged with each other. On the other hand, when there occurs an uplock, the tooth tips of the spline teeth 70, 72 contact with each other, and it is difficult to further push the spline teeth 70, 72 in between the counter spline teeth 72, 70.

Subsequently, in S3 corresponding to the elapsed time determination unit 110, it is determined whether the predetermined time ta has elapsed from when the command to engage the dog clutch D1 is output. When negative determination is made in S3, the state where the first pressing force F1 acts on the hub sleeve 61 is kept. When affirmative determination is made in S3, that is, when the predetermined time ta has elapsed, in S4 corresponding to the change control unit 106, a hydraulic pressure is supplied to the hydraulic actuator of the hub sleeve 61 so that the pressing force that acts on the hub sleeve 61 becomes the second pressing force F2 smaller than the first pressing force F1. After the second pressing force F2 acts on the hub sleeve 61, a change of the engaged/released state is started for releasing the belt driving clutch C2 and engaging the forward clutch C1.

Subsequently, in S5 corresponding to the torque input determination unit 112, it is determined whether the torque Tin is input from the engine side to the hub sleeve 61 with an increase in the torque capacity of the forward clutch C1. When negative determination is made in S5, determination of S5 is repeatedly carried out until affirmative determination is made in S5. When affirmative determination is made in S5, it means that the torque Tin is input to the hub sleeve 61. At this time, when there occurs an uplock, the uplock is easy to be released by reducing the pressing force F acting on the hub sleeve 61 to the second pressing force F2, and, in addition, the spline teeth 70, 72 are displaced in the rotation direction by inputting the torque Tin to the hub sleeve 61, so the uplock is released. In S6 corresponding to the change control unit 106, a hydraulic pressure is supplied to the hydraulic actuator again so that the pressing force F that is able to push the hub sleeve 61 into the synchronizer ring 64 acts on the hub sleeve 61. Thus, engagement of the spline teeth 70, 72 is resumed after the uplock is released. In S7 corresponding to the change control unit 106, it is determined whether the predetermined time tc has elapsed from when the hub sleeve 61 starts being pushed into the synchronizer ring 64. While negative determination is made in S7, determination of S7 is repeated. When affirmative determination is made in S7, that is, when the predetermined time tc has elapsed from when the hub sleeve 61 starts being pushed into the synchronizer ring 64, it is determined that connection of the dog clutch D1 by the synchromesh mechanism S1 has completed, and the routine is ended.

Figure 9:
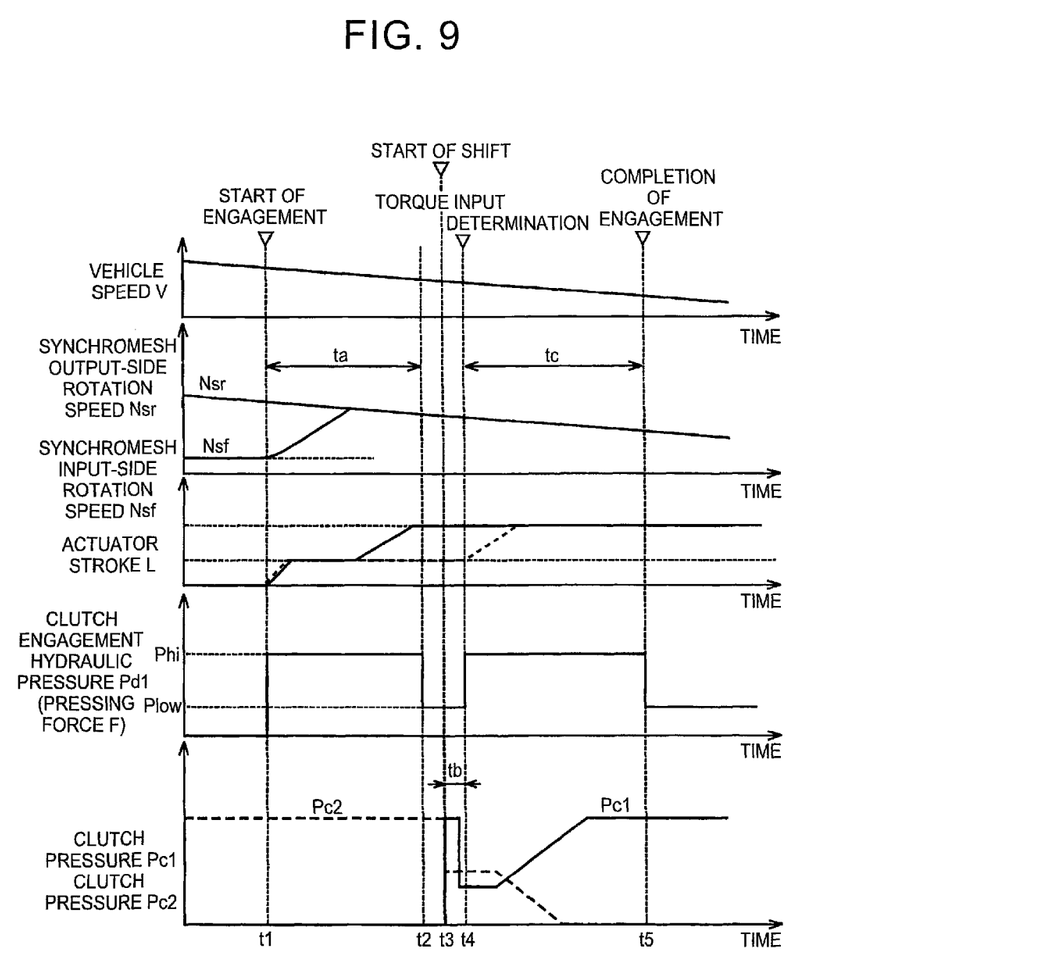
FIG. 9 is a time chart that, shows the result of operations based on the flowchart shown in FIG. 8.

FIG. 9 is a time chart that shows the result of operation based on the flowchart shown in FIG. 8. In FIG. 9, the abscissa axis represents time, and the ordinate axis represents, from above, the vehicle speed V, a synchromesh output-side rotation speed Nsr corresponding to the rotation speed of the second gear 50, a synchromesh input-side rotation speed Nsf corresponding to the rotation speed of the first gear 48, an actuator stroke L corresponding to a displacement of the hub sleeve 61, a clutch engagement hydraulic pressure Pd1 corresponding to a hydraulic pressure of the hydraulic actuator that generates a pressing force that acts on the hub sleeve 61 of the synchromesh mechanism S1, a clutch pressure Pc1 corresponding to a hydraulic pressure of the hydraulic actuator of the forward clutch C1 and a clutch pressure Pc2 corresponding to a hydraulic pressure of the hydraulic actuator of the belt driving clutch C2. The clutch engagement hydraulic pressure Pd1, the clutch pressure Pc1 and the clutch pressure Pc2 all indicate command pressures.

As shown in the time chart, when the vehicle speed V decreases and it is determined at, for example, t1 timing, that the vehicle speed V falls within the preset driving region of the gear driving mode, engagement (connection) of the dog clutch D1 by the synchromesh mechanism S1 is started in order to change from the belt driving mode to the gear driving mode. At t1 timing, the clutch engagement hydraulic pressure Pd1 of the hydraulic actuator of the synchromesh mechanism S1 is set to a hydraulic pressure Phi by which the pressing force that acts on the hub sleeve 61 becomes the first pressing force F1. Accordingly, the actuator stroke L of the hydraulic actuator of the synchromesh mechanism S1 increases, the shifting key 62 is pressed against the synchronizer ring 64, and friction force is generated between the shifting key 62 and the synchronizer ring 64 and between the synchronizer ring 64 and the cone portion 68 of the second gear 50, so the synchromesh input-side rotation speed Nsf increases. The continuous line of the actuator stroke L corresponds to that in the case where there is no uplock. In the case where there is no uplock, when the first pressing force F1 acts on the hub sleeve 61, the actuator stroke L increases to a value at which the dog clutch D1 is engaged. On the other hand, the dashed line corresponds to that in the case where there is an uplock, and an increase in the actuator stroke L is blocked at a predetermined position.

At t2 timing at which the predetermined time to has elapsed from the start of engagement of the dog clutch D1 by the synchromesh mechanism S1, the clutch engagement hydraulic pressure Pd1 of the hydraulic actuator of the synchromesh mechanism S1 is reduced to a hydraulic pressure Plow corresponding to the second pressing force F2. Thus, in the case where there is an uplock, the state of the uplock is alleviated. That is, friction force that is generated at the contact faces of the tooth tips of the spline teeth 70, 72 that contact with each other is reduced. At t3 timing, a change of the engaged/released state is started between the forward clutch C1 and the belt driving clutch C2, the torque Tin is input from the engine side to the hub sleeve 61 at t4 timing elapsed the predetermined time tb from t3 timing, so there occurs a displacement in the rotation direction between the spline teeth 70, 72, and the uplock is released. At t4 timing, the clutch engagement hydraulic pressure Pd1 is set to a hydraulic pressure (for example, the hydraulic pressure Phi) that is required to engage the dog clutch D1, the actuator stroke L increases as indicated by the dashed line, and engagement of the dog clutch D1 completes at t5 timing elapsed the predetermined time tc from t4 timing. In this way, even when there occurs an uplock, the dog clutch D1 is reliably engaged. In the present embodiment, the hydraulic pressure Plow is set to a hydraulic pressure higher than a hydraulic pressure corresponding to the maximum stroke of the hydraulic actuator.

As described above, according to the present embodiment, in engaging (connecting) the dog clutch D1 by operating the synchromesh mechanism S1, when there occurs an uplock at the time when the first pressing force F1 acts on the hub sleeve 61, the tooth tips of the spline teeth 70 of the hub sleeve 61 contact with the tooth tips of the spline teeth 72 of the synchronizer ring 64, and these spline teeth 70, 72 cannot be engaged with each other. However, after that, the second pressing force F2 acts on the hub sleeve 61. Thus, the uplock is easy to be released. In addition, the torque Tin from the engine 14 acts on the hub sleeve 61, so there arises a displacement in the rotation direction between the mutually contacting spline teeth 70, 72, so the uplock is reliably released. In this way, even when there occurs an uplock, it is possible to engage the dog clutch D1 by releasing the uplock. When there occurs an uplock, an operation, such as cancelling the operation of the synchromesh mechanism S1 once, is not required, so control is also simple, and extension of an engagement time is avoided.

According to the present embodiment, engagement of the forward clutch C1 is started in a state where the second pressing force F2 acts on the hub sleeve 61, and the torque Tin from the engine 14 is transmitted to the hub sleeve 61 via the forward clutch C1. Thus, the hub sleeve 61 and the synchronizer ring 64 are displaced in the rotation direction, so the uplock is released.

According to the present embodiment, when the uplock is released, the pressing force F that is required to engage the hub sleeve 61 with the synchronizer ring 64 acts on the hub sleeve 61, so the dog clutch D1 is reliably engaged.

According to the present embodiment, the vehicle is allowed to travel by using the first power transmission path when the forward clutch C1 and the dog clutch D1 are engaged and the belt driving clutch C2 is released, and the vehicle is allowed to travel by using the second power transmission path when the forward clutch C1 and the dog clutch D1 are released and the belt driving clutch C2 is engaged. In changing from the second power transmission path to the first power transmission path, the dog clutch D1 and the forward clutch C1 need to be engaged. At this time, By causing the second pressing force F2 to act on the hub sleeve 61 that constitutes the synchromesh mechanism D1, and additionally starting engagement of the forward clutch C1, the torque Tin is input to the hub sleeve 61. Thus, when there is an uplock, the uplock is reliably released.

According to the present embodiment, the dog clutch D1 is released while the torque of the engine 14 is transmitted to the output shaft 25 via the continuously variable transmission 20, so co-rotation of the rotating members (gear mechanism 22, and the like) that constitute the power transmission path between the dog clutch D1 and the forward/reverse switching device 18 is suppressed. Therefore, fuel economy improves, and a decrease in durability due to high rotation of the rotating members is also suppressed.

The embodiment of the invention is described in detail with reference to the drawings; however, the invention is also applicable to another mode.

For example, the synchromesh mechanism S1 according to the above-described embodiment operates under hydraulic pressure supplied to the hydraulic actuator. However, the actuator is not always limited to the hydraulic actuator, and, for example, the synchromesh mechanism S1 may be operated by an electric motor. This is because it is possible to change the pressing force by controlling the output torque of the electric motor.

The synchromesh mechanism S1 according to the above-described embodiment is configured such that the hub sleeve 61 is constantly fitted to the first gear 48; instead, the second gear 50 may be constantly fitted to the hub sleeve 61.

In the above-described embodiment, it is determined in step S7 of FIG. 8 whether the predetermined time tc has elapsed from when application of the pressing force that is able to push the hub sleeve 61 into the synchronizer ring 64 is started; however, the step of determining whether the predetermined time tc has elapsed is not necessarily required.

The electronic control unit 80 according to the above-described embodiment is split into applications, such as an electronic control unit for controlling the engine, an electronic control unit for controlling the continuously variable transmission and an electronic control unit for changing the driving pattern; however, the electronic control unit 80 does not always need to be split, and may be formed of a single electronic control unit.

In the above-described embodiment, the invention of the present application is applied to the driving system 12 in which the continuously variable transmission 20 and the gear mechanism 22 are provided in parallel with each other and the power transmission path is changed on the basis of the traveling state. The invention of the present application is not limited to the driving system 12. The invention may be applied to a dog clutch including a synchromesh mechanism where appropriate.

In the above-described embodiment, the gear mechanism 22 includes a single-step speed ratio; however, the gear mechanism 22 may have two or more step speed ratios and may be shifted as needed.

In the above-described embodiment, the continuously variable transmission 20 is formed of a belt-type continuously variable transmission; instead, the continuously variable transmission 20 may be replaced with, for example, a toroidal continuously variable transmission, or the like, as needed.

In the above-described embodiment, the engine 14 is employed as the driving force source; however, the driving force source is, not always limited to the engine 14. The driving force source may be changed as needed as long as it functions as the driving force source, such as an electric motor.

The above-described embodiment is only illustrative, and the invention may be implemented in modes including various modifications or improvements on the basis of the knowledge of persons skilled in the art.

What is claimed is:

1. A control apparatus for a vehicle, the vehicle including a dog clutch including a synchromesh mechanism, the synchromesh mechanism including a sleeve and a synchronizer ring, the sleeve being pressed against the synchronizer ring by a predetermined pressing force to be synchronized with the synchronizer ring when engagement of the dog clutch is determined, and then the dog clutch being engaged, the control apparatus comprising:

an electronic control unit configured to:
(a) in engaging the dog clutch, cause a first pressing force to act on the sleeve, the first pressing force being required to engage the sleeve with the synchronizer ring;
(b) after causing the first pressing force to act on the sleeve, cause a second pressing force to act on the sleeve, the second pressing force being smaller than the first pressing force, a synchronized state of the sleeve with the synchronizer ring being kept by the second pressing force under a condition that no torque is input to the sleeve; and
(c) while causing the second pressing force to act on the sleeve, input torque from a driving force source of the vehicle to the sleeve.

2. The control apparatus according to claim 1, wherein
a first clutch is provided in a power transmission path between the driving force source and the sleeve, and
the electronic control unit is configured to, after causing the second pressing force to act on the sleeve, input torque from the driving force source to the sleeve by starting engagement of the first clutch.

3. The control apparatus according to claim 2, wherein
a continuously variable transmission and a gear mechanism are provided in parallel with each other between an input shaft and an output shaft, torque output from the driving force source is input to the input shaft, the torque is transmitted to the output shaft,
the first clutch and the dog clutch are inserted in a first power transmission path through which torque of the driving force source is transmitted from the input shaft via the gear mechanism to the output shaft,
a second clutch is inserted in a second power transmission path through which torque of the driving force source is transmitted from the input shaft via the continuously variable transmission to the output shaft, the second clutch connects or interrupts the second power transmission path, and
the electronic control unit is configured to, when a power transmission path during traveling is changed from the second power transmission path to the first power transmission path, start engagement of the dog clutch, and, when the second pressing force is caused to act on the sleeve, release the second clutch and engage the first clutch.

4. The control apparatus according to claim 2, wherein
a continuously variable transmission and a gear mechanism are provided in parallel with each other between an input shaft and an output shaft, torque output from the driving force source is input to the input shaft, the torque is transmitted to the output shaft,
the first clutch and the dog clutch are inserted in a first power transmission path through which torque of the driving force source is transmitted from the input shaft via the gear mechanism to the output shaft,
a second clutch is inserted in a second power transmission path through which torque of the driving force source is transmitted from the input shaft via the continuously variable transmission to the output shaft, the second clutch connects or interrupts the second power transmission path, and
the electronic control unit is configured to, while torque of the driving force source is transmitted via the second power transmission path to the output shaft, release the dog clutch.

5. The control apparatus according to claim 1, wherein
the electronic control unit is configured to, after inputting torque from the driving force source to the sleeve, cause a pressing force to act on the sleeve, the pressing force being required to engage the sleeve with the synchronizer ring.

6. A control method for a vehicle, the vehicle including a dog clutch and an electronic control unit, the dog clutch including a synchromesh mechanism, the synchromesh mechanism including a sleeve and a synchronizer ring, the sleeve being pressed against the synchronizer ring by a predetermined pressing force to be synchronized with the synchronizer ring when engagement of the dog clutch is determined, and then the dog clutch being engaged, the control method comprising:
(a) in engaging the dog clutch, causing, by the electronic control unit, a first pressing force to act on the sleeve, the first pressing force being required to engage the sleeve with the synchronizer ring;
(b) after causing the first pressing force to act on the sleeve, causing, by the electronic control unit, a second pressing force to act on the sleeve, the second pressing force being smaller than the first pressing force, a synchronized state of the sleeve with the synchronizer ring being kept by the second pressing force under a condition that no torque is input to the sleeve; and
(c) while causing the second pressing force to act on the sleeve, inputting, by the electronic control unit, torque from a driving force source of the vehicle to the sleeve.

7. The control method according to claim 6, wherein
a first clutch is provided in a power transmission path between the driving force source and the sleeve, the control method further comprising:
after causing the second pressing force to act on the sleeve, inputting, by the electronic control unit, torque from the driving force source to the sleeve by starting engagement of the first clutch.

8. The control method according to claim 7, wherein
a continuously variable transmission and a gear mechanism are provided in parallel with each other between an input shaft and an output shaft, torque output from the driving force source is input to the input shaft, the torque is transmitted to the output shaft,
the first clutch and the dog clutch are inserted in a first power transmission path through which torque of the driving force source is transmitted from the input shaft via the gear mechanism to the output shaft, and
a second clutch is inserted in a second power transmission path through which torque of the driving force source is transmitted from the input shaft via the continuously variable transmission to the output shaft, the second clutch connects or interrupts the second power transmission path, the control method further comprising:
when a power transmission path during traveling is changed from the second power transmission path to the first power transmission path,
(i) starting engagement of the dog clutch by the electronic control unit, and
(ii) when the second pressing force is caused to act on the sleeve, releasing the second clutch and engaging the first clutch by the electronic control unit.

9. The control method according to claim 8, further comprising:
while torque of the driving force source is transmitted via the second power transmission path to the output shaft, releasing the dog clutch by the electronic control unit.

10. The control method according to claim 6, further comprising:
after inputting torque from the driving force source to the sleeve, causing, by the electronic control unit, a pressing force to act on the sleeve, the pressing force being required to engage the sleeve with the synchronizer ring.

11. A vehicle comprising:
a dog clutch including a synchromesh mechanism, the synchromesh mechanism including a sleeve and a synchronizer ring, the sleeve being pressed against the synchronizer ring by a predetermined pressing force to be synchronized with the synchronizer ring when engagement of the dog clutch is determined, and then the dog clutch being engaged; and
an electronic control unit configured to:
(a) in engaging the dog clutch, cause a first pressing force to act on the sleeve, the first pressing force being required to engage the sleeve with the synchronizer ring,
(b) after causing the first pressing force to act on the sleeve, cause a second pressing force to act on the sleeve, the second pressing force being smaller than the first pressing force, a synchronized state of the sleeve with the synchronizer ring being kept by the second pressing force under a condition that no torque is input to the sleeve, and
(c) while causing the second pressing force to act on the sleeve, input torque from a driving force source of the vehicle to the sleeve.

12. The vehicle according to claim 11, further comprising:
a first clutch provided in a power transmission path between the driving force source and the sleeve, wherein
the electronic control unit is configured to, after causing the second pressing force to act on the sleeve, input torque from the driving force source to the sleeve by starting engagement of the first clutch.

13. The vehicle according to claim 12, further comprising:
an input shaft to which torque output from the driving force source is input;
an output shaft to which the torque is transmitted;
a continuously variable transmission and a gear mechanism provided in parallel with each other between the input shaft and the output shaft; and
a second clutch inserted in a second power transmission path through which torque of the driving force source is transmitted from the input shaft via the continuously variable transmission to the output shaft, the second clutch being configured to connect or interrupt the second power transmission path, wherein
the first clutch and the dog clutch are inserted in a first power transmission path through which torque of the driving force source is transmitted from the input shaft via the gear mechanism to the output shaft.

14. The vehicle according to claim 13, wherein
the electronic control unit is configured to, when a power transmission path during traveling is changed from the second power transmission path to the first power transmission path, start engagement of the dog clutch, and, when the second pressing force is caused to act on the sleeve, release the second clutch and engage the first clutch.

15. The vehicle according to claim 13, wherein
the electronic control unit is configured to, while torque of the driving force source is transmitted via the second power transmission path to the output shaft, release the dog clutch.

16. The vehicle according to claim 11, wherein
the electronic control unit is configured to, after inputting torque from the driving force source to the sleeve, cause a pressing force to act on the sleeve, the pressing force being required to engage the sleeve with the synchronizer ring.

* * * * *